UNITED STATES PATENT OFFICE.

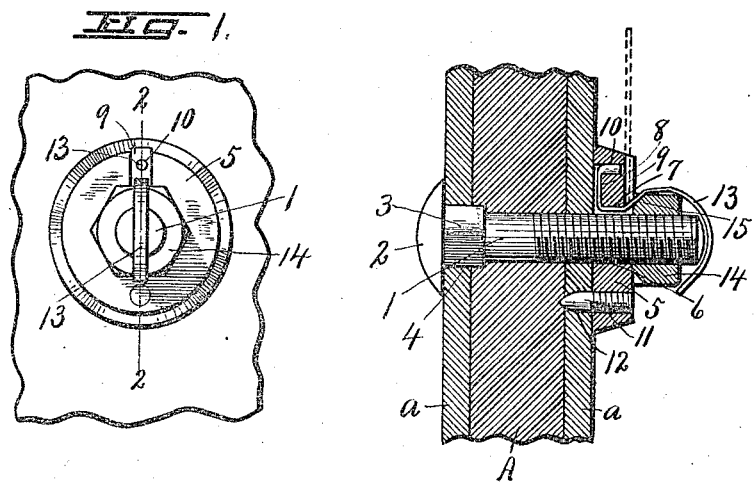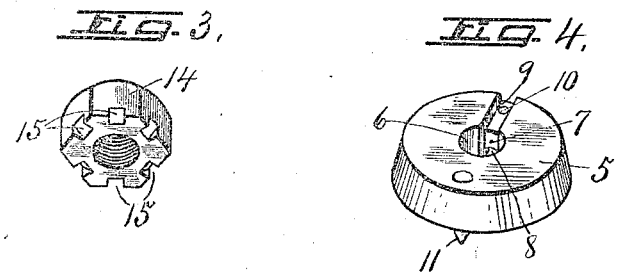

THOMAS E. O'NEIL, OF CLINTON, NEW YORK.

CLAMPING DEVICE.

1,293,524.  Specification of Letters Patent.  Patented Feb. 4, 1919.

Application filed May 4, 1917. Serial No. 166,331.

*To all whom it may concern:*

Be it known that I, THOMAS E. O'NEIL, a citizen of the United States of America, and resident of Clinton, in the county of Oneida, in the State of New York, have invented new and useful Improvements in Clamping Devices, of which the following, taken in connection with the accompanying drawings, is a full, clear, and exact description.

This invention relates to certain improvements in clamping devices, involving the use of a bolt, a nut and washer for clamping two or more parts together, and suitable means for locking the washer to one of said parts with additional means for locking the bolt, nut and washer against relative turning movement.

In other words, the invention is directed more particularly to the means for locking the bolt, nut and washer against turning movement relatively to the parts clamped together thereby.

The main object is to provide a bendable nut-locking device normally interlocked with the washer in such manner that it normally holds itself in operative position thereon so that the washer with the locking device may be sold as a unit to be applied to the bolt and bent over and against the nut to hold the latter in operative engagement with the bolt against loosening by backing off the threads.

Another object is to enable the bendable locking device to be replaced by a new one upon the same washer in case it should become impaired by breaking or otherwise.

A further object is to provide simple means for locking the washer against turning relatively to the parts which are clamped together.

Other objects and uses will be brought out in the following description.

In the drawings—

Figure 1 is a face view of the clamping device as applied to a series of, in this instance three, parts clamped together thereby.

Fig. 2 is a sectional view taken on line 2—2, Fig. 1.

Figs. 3, 4 and 5 are perspective views showing, respectively, the nut, the washer and the bendable nut-locking member.

The parts to be clamped together may be the web —A— of a railway rail and opposite fish plates —a—, all of said parts being provided with registering bolt holes for receiving the clamping device presently described.

This clamping device comprises a bolt —1— having a head —2— and an angular portion —3— adjacent the head adapted to enter a corresponding angular opening —4— in the adjacent plate —a—, said bolt being extended through registering apertures in the parts —A— and —a—.

A washer —5— is placed over and upon the threaded end of the bolt against the adjacent portions of the plate —a— opposite that which is engaged by the head —2—, and in addition to its central bolt opening —6— is provided with an axially extending key-way —7— and radial grooves or recesses —8— and —9— in its inner and outer faces, respectively.

Both of these grooves or channels —8— and —9— communicate at their inner ends with the key-way —7—, the outer groove or channel —9— being extended from said key-way, to the periphery of the washer, while the inner channel —8— is of less radial length than the radius of the washer and communicates at its outer end with an axially extending hole or aperture —10— connecting the grooves or channels —8— and —9— some distance from the central opening —6—.

The washer —5— is also provided with a stud or pin —11— extending beyond its inner face for engagement with an aperture or socket —12— in the adjacent plate —a— for locking the washer against turning movement relatively to said plate.

A locking member —13— preferably of flat bendable metal has one end seated in the aperture —10— and radial channel —8— and its remaining portions extended outwardly through the key-way —7— and bent radially and outwardly to the position shown by dotted lines, Fig. 2, so as to extend radially through the groove or channel —9— wholly within the outer end face of the washer —5— to permit the nut, as —14—, to be turned freely in tightening the clamp upon the parts —A— and —a—.

The nut —14— is preferably angular as hexagonal in cross section and its inner end is provided with a circumferential series of grooves —15— inclining outwardly from the center toward the outer end, one for each side for receiving a portion of the locking member —13—, when one or the other of the grooves or channels —15— is registered therewith during the tightening operation.

As soon as the nut is properly tightened and one or the other of the grooves —15— is registered with the adjacent portion of the locking member —13—, while the latter is still in its normal position, the free end of the locking member is engaged by hand by suitable tool and bent upwardly into the registering groove —15— and against the flat side of the nut —14—, and if long enough may be bent over and upon the outer end of the bolt, as shown in Figs. 1 and 2, although the main object is to make the free end of the locking member long enough to enter the registering groove —15— and to lie flatwise against the corresponding side of the nut, whereby the nut and washer will be positively locked to each other against relative turning movement, while the stud —12— serves to hold the washer against turning movement against the parts —A— and —a—.

It will be observed that while the main body of the nut overlies the central opening —6— in the washer, its recesses or grooves —15— are undercut toward the center a sufficient distance to communicate with the key-way —7—, thereby leaving a clear opening for the reception of the adjacent portion of the locking member —13—.

If it is desired to loosen the nut all that is necessary to do is to bend the free end of the locking member —13— back to the position shown by dotted lines so that it will lie within the groove or channel —9—, thus permitting the nut to be turned without disturbing the washer, or if desired, after the nut is removed, the bolt and washer may also be removed or withdrawn with the assurance that the locking member —13— will remain with the washer after its free end has been bent out to the position shown by dotted lines.

The locking members —13— are usually stamped or pressed to the L-shape form shown in Fig. 5 so that the longer end may be inserted through the key-way and the shorter end registered with the aperture —10—, after which the longer end is bent over into the groove or channel —9— to hold the member in operative position on the washer, thus permitting the washer with the locking member thereon to be handled as a unit.

What I claim is:

A clamping device of the character described comprising a bolt, a nut, and a washer having radial channels in its inner and outer end faces, said washer being also provided with a key-way adjacent its bolt opening and an aperture some distance from the keyway, said channels, key-way and aperture being disposed in the same radial plane, and a bendable key seated in said key-way and also in the inner channel and having one end inserted in said aperture and its other end bendable into and out of the outer channel and also into and out of engagement with said nut.

In witness whereof I have hereunto set my hand this 11th day of April, 1917.

THOMAS E. O'NEIL.

Witnesses:
  OWEN J. BURNS,
  ARTHUR V. KEITH.

Copies of this patent may be obtained for five cents each, by addressing the "Commissioner of Patents, Washington, D. C."